United States Patent
Kaminsky et al.

(10) Patent No.: US 6,898,012 B2
(45) Date of Patent: *May 24, 2005

(54) LIGHT REFLECTOR WITH VARIABLE DIFFUSE LIGHT REFLECTION

(75) Inventors: Cheryl J. Kaminsky, Rochester, NY (US); Robert P. Bourdelais, Pittsford, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 10/147,775

(22) Filed: May 16, 2002

(65) Prior Publication Data

US 2003/0214718 A1 Nov. 20, 2003

(51) Int. Cl.$^7$ .................................................. G02B 5/02
(52) U.S. Cl. ........................ 359/599; 359/619; 359/707
(58) Field of Search ...................... 359/599, 613–614, 359/619–624, 626, 454–456, 707; 349/112–113, 62, 64, 67, 95; 362/31

(56) References Cited

U.S. PATENT DOCUMENTS

| | | | | |
|---|---|---|---|---|
| 5,134,549 A | * | 7/1992 | Yokoyama | 362/31 |
| 5,837,346 A | * | 11/1998 | Langille et al. | 428/141 |
| 5,917,567 A | | 6/1999 | Oh et al. | 349/113 |
| 6,266,476 B1 | | 7/2001 | Shie et al. | 385/147 |
| 6,608,722 B2 | * | 8/2003 | Cowan et al. | 359/599 |
| 6,638,692 B1 | * | 10/2003 | Banal et al. | 430/320 |
| 6,692,902 B2 | * | 2/2004 | Wong et al. | 430/322 |
| 6,712,481 B2 | * | 3/2004 | Ezell et al. | 362/31 |
| 6,750,930 B2 | * | 6/2004 | Yoshii et al. | 349/113 |

FOREIGN PATENT DOCUMENTS

JP    55073040 A  *  6/1980  ........... G03B/21/60

* cited by examiner

*Primary Examiner*—Mark A. Robinson
*Assistant Examiner*—Lee Fineman
(74) *Attorney, Agent, or Firm*—Arthur E. Kluegel

(57) ABSTRACT

Disclosed is a diffuse reflector comprising a macro reflection efficiency variation. The invention provides improved light reflection for a back lit display while simultaneously diffusely reflecting specular light sources.

42 Claims, 4 Drawing Sheets

LIGHT REFLECTOR WITH VARIABLE DIFFUSE LIGHT REFLECTION

CROSS-REFERENCE TO RELATED APPLICATIONS

This application is one of a group of five applications co-filed under application Ser. Nos. 10/147,703; 10/147,776; 10/147,777; 10/147,775; and 10/147,659; the contents of which are incorporated herein by reference.

FIELD OF THE INVENTION

The invention relates to a diffuse reflector comprising a macro reflection efficiency variation which serves to diffuse specular light. In a preferred form, the invention relates to a variable back light diffuse reflector for transmission, transflection, and reflection type rear projection liquid crystal display devices.

BACKGROUND OF THE INVENTION

Reflectors are often used in optical displays, such as liquid crystal displays, to even out illumination across the display and to diffusely reflect the light from the backlight or light coming in the display from the environment. Prior art reflectors include planar specular reflectors and planar diffusive reflectors. Specular reflectors include a substantially planar surface that is covered with a reflective metallic coating. Specular reflectors are characterized by an angle of incidence being substantially equal to an angle of reflection. Diffusive reflectors typically have a roughened surface which is predominately coated with a metallic reflective coating. Diffusive reflectors are characterized by reflecting and scattering incident light.

The transmission-type LCD includes a backlight, typically one to two cold fluorescent bulbs at the back surface of the liquid-crystal panel. The backlight consumes a relatively large amount of power. The diffuse reflector evens out the illumination of the back light across the entire display to eliminate any hot (brighter) spots. The more efficient a reflector is at diffusing, the more even the light will be across the display. The more efficient the reflector is, minimizing the amount of light lost to transmission and absorption, the more light passes through the liquid crystal and is realized as a brighter screen. This more efficient diffuse reflector can be used for a brighter display or for less power use that extends battery life Reflection-type LCDs include a reflector for reflecting light at a back surface of the LCD, in which ambient light is reflected on the reflector to display images. The diffuse reflector reflects and diffuses the ambient light to mask any hot spots due to differences in ambient lighting across the display. The more efficient the reflection and diffusion of the reflector is, the brighter the display can be. This display does not use a backlight reducing the amount of required power but the ambient light reflection cannot produce satisfactory brightness for vivid color images and is used on calculator and other text displays.

A transflection display is a combination of a transmission display and a reflection display. A cell phone and PDA (personal desk assistant) are examples of this type of device. They work in both reflection and transmission mode using ambient light and a backlight alternatively. The diffuse reflector in this application reflects and diffuses the backlight and the ambient light to give a bright, even display in both modes. A transflector increases efficiency and brightness under both ambient and supplemental lighting conditions in visual display applications. In an attempt to overcome the above described drawbacks of reflective and transmissive displays, some electronic displays have been designed to use ambient light when available and back lighting only when necessary. This dual function of reflection and transmission leads to the designation, "transflective". One problem with currently available transflective displays is that they have good performance in either reflective or transmissive mode, but not both. This stems from the fact that the backlight assembly is not as efficient a diffuser/reflector as the back reflector and diffuser traditionally used in a purely reflective display, and the display thus appears less bright when viewed under ambient light. In addition, many devices with small display screens, such as pagers, use reflective LCDs with a supplemental electroluminescent backlight for low ambient light conditions. The LCD is backed with a plastic film that is partially reflective and partially transmitting. A transflective display can be made by placing a transflective film between the rear polarizer and the backlight. The transflective film provides a specified trade-off between reflectivity for ambient lighting and transmission for backlit operation.

It is desirable to have the amount of diffuse reflectance vary across the reflection film, to compensate for uneven brightness across a backlit display. A reflection film with uniform diffuse reflection across the film must have the reflection efficiency to diffuse the most intense, specular areas of the display across the display. These reflectors tend to need high levels of reflection efficiency causing light to be scattered at a wide angle across the entire film, where the light is scattered around the edges of the film and lost. With a reflector with a variable reflection efficiency, the areas of high specular light could be more diffusely reflected than areas of less specular light. The result would be a display that had even diffuse light across it while having a higher overall reflection value compared to the uniform diffuse reflection film and a brighter display.

The variable reflector of the present invention can replace the dot printing on the light guide in an LCD. The light guide is typically a thick (approx. half a centimeter) piece of acrylic designed to guide the light from the light sources (located on at least one of the edges of the light guide) out to the display at a normal and to even the illumination from the light sources across the display. The evening of illumination is produced by a dot pattern printed on the back side (the side facing the reflector) of the light guide. The dot pattern varies in size across the display (smaller and fewer dots towards the light source and larger and more frequent dots away from the light source). The dot pattern's purpose is to try to direct more light out from the light guide away from the light sources and less light out of the display near the light sources. This causes the brightness of the display to be more homogeneous. In this prior art method of evening illumination, printing is a very costly and time consuming because each light guide is screen printed individually. The current invention of a variable reflector can produce the same result of evening out the illumination by having more diffuse areas near the light source(s) and specular areas more away from the light source(s). In addition, the current invention is a roll to roll process making it much cheaper and faster to manufacturing. Having a variable reflector with a diffuse reflectance gradient behind the light guide eliminates the need for the screen printed dots thus eliminating a processing step and saving manufacturing time and money.

Diffuse reflectors for light have been manufactured in a number of ways. Generally, diffuse reflectors are made by taking a reflective surface and roughening one of its faces.

One method of manufacture involves sprinkling powders on a flat surface and gluing the powders to the surface. A second method involves grinding or blasting a metal or glass surface to achieve the necessary roughness for diffusely reflecting infrared wavelengths. A third method is to dimple an aluminum surface with a regular hexagonal array of approximately 1/64-inch diameter holes.

The primary disadvantages of the above methods of roughening a reflective surface is that they either do not make the surface rough enough or they do not make the roughness random enough to enable the surface to function as an isotropic diffuse reflector. If the surface is not rough enough the reflectance will not be perfectly diffuse and it will have an enhancement or peak in the specular direction that gets longer at longer wavelengths. If the roughness is non-random, the non-randomness will create diffraction effects that favor particular off-specular directions of reflection, thus making the diffuse reflectance non-isotropic. Other general methods for roughening a surface include electric discharge machining (EDM). U.S. Pat. No. 3,754,873 (Bills et al.) discloses a cold rolled sheet having a roughened surface formed by projections of such shape and arrangement that the visual appearance of the surface of the sheet is relatively constant. EDM is cost and time prohibitive to make diffuse reflectors on a large scale.

U.S. Pat. No. 5,976,686 (Kaytor et al.) relates to a diffuse reflector made of porous polymeric sheets using thermally induced phase separation technology (TIPS). The TIPS diffuse reflector can not deliver as high a reflectivity as a metallized surface. To achieve the same brightness of a backlit display with a metallized surface, a display with a TIPS diffuse reflector would have to increase the brightness of the backlight, reducing the lifetime of the battery. The light scattering regions of the TIPS diffuse reflector are on the order of the wavelength of light and could add color to the light diffused thus imparting a non-desirable coloration to the display.

U.S. Pat. No. 5,917,567 (Oh at al.) relates to a reflector having diffusion characteristics in which the surface of the reflector is formed with a plurality of convex portions by uniformly depositing fine spacers. The reflector is manufactured by providing a substrate, forming a thin layer of a solution of beads and polymer on the substrate, and forming a reflective layer on the thin layer. The beads form simple reflective lenses as compared to the complex lenses used in this invention. Complex lenses provide more efficient diffusion because of the multitude of lens surfaces and thus provide more efficient diffusion than can be obtained with a simple lens diffuse reflector.

Other diffuse reflectors used as reflectors in displays use a voided polymer structure with titanium dioxide. This provides for a high amount of diffusion, but does not have the high amount of reflectivity leading to a darker display.

U.S. Pat. No. 6,261,994 (Bourdelais et al.) describes a reflective photographic base materials made up of layers of biaxially oriented polyolefin sheet with voiding, $TiO_2$ and colorants adjusted to provide optimum reflection properties. Voided films with $TiO_2$ typically have diffuse reflectance measurements of 85 to 88% at 500 nm making them inferior to the variable diffuse reflectors without inorganics that have more efficient diffuse reflectances. Also, voided films tend to be thicker and therefore add weight to the display device.

U.S. Pat. No. 6,018,379 (Mizobata) describes a conventional reflective liquid crystal display that has been configured to form a convex-concave at the reflecting surface of the reflector. To form the concave-convex surface, it is necessary to deposit an insulating film and to pattern the deposited insulating film to form the convex-concave surface. The fine control of a shape such as an inclined angle of the convex-concave is difficult, with the result that a sufficient light scattering cannot be obtained. Abrading or grinding the surface with abrasive powder and further etching it with a hydrofluoric acid if necessary can also form the convex-concave surface. A light scattering coating can be formed by spin-coating. These methods described are labor and time intensive, use hazardous materials, and must be made in a sheet as instead of rolls making them prohibitively expensive.

It is known to produce polymeric film having a resin coated on one surface thereof with the resin having a surface texture. This kind of polymeric film is made by a thermoplastic embossing process in which raw (uncoated) polymeric film is coated with a molten resin, such as polyethylene. The polymeric film with the molten resin thereon is brought into contact with a chill roller having a surface pattern. Chilled water is pumped through the roller to extract heat from the resin, causing it to solidify and adhere to the polymeric film. During this process the surface texture on the chill roller's surface is embossed into the resin coated polymeric film. Thus, the surface pattern on the chill roller is critical to the surface produced in the resin on the coated polymeric film.

One known prior process for preparing chill rollers involves creating a main surface pattern using a mechanical engraving process. The engraving process has many limitations including misalignment causing tool lines in the surface, high price, and lengthy processing. Accordingly, it is desirable to not use mechanical engraving to manufacture chill rollers.

The U.S. Pat. No. 6,285,001 (Fleming et al) relates to an exposure process using excimer laser ablation of substrates to improve the uniformity of repeating microstructures on an ablated substrate or to create three-dimensional microstructures on an ablated substrate. This method is difficult to apply to create a master chill roll to manufacture complex random three-dimensional structures and is also cost prohibitive.

In U.S. Pat. No. 6,124,974 (Burger) the substrates are made with lithographic processes. This lithography process is repeated for successive photomasks to generate a three-dimensional relief structure corresponding to the desired lenslet. This procedure to form a master to create three-dimensional features into a plastic film is time consuming and cost prohibitive.

In U.S. Pat. No. 5,223,383 photographic elements containing reflective or diffusely transmissive supports are disclosed. While the materials and methods disclosed in this patent are suitable for reflective photographic products, the % light energy transmission (less than 40%) is not suitable for liquid crystal display as % light transmission less than 40% would unacceptable reduce the brightness of the LC device.

In U.S. Pat. No. 6,266,476 (Shie et al.) a monolithic element having a substrate body and a macro-optical characteristic produced by surface micro-structures. These micro-structures can be non-uniform across the lens to minimize certain lens aberrations. These non-uniform micro-structures reduce lens aberrations, but are not able to significantly alter the macro-optical characteristics of the optical body. The diffusing structures, in this invention, vary as to change the macro diffusion efficiency across the diffusion film. The diffusion elements can vary changing the diffusion characteristics of the diffusion area from diffusing most of the light to letting light pass specularly which micro-structures are unable to do.

There remains a need for an improved diffuse light reflection of image illumination light sources to provide a desired level of both light reflection and light diffusion.

SUMMARY OF THE INVENTION

The invention provides a diffuse reflector comprising a macro reflection efficiency variation. The invention also provides a diffuse reflector for rear projection displays, back-lighted imaging media, a liquid crystal display component and device. The invention provides a process providing a diffuse reflector where the reflection efficiency is selectively modified and a process providing a diffuse reflector wherein variable reflection efficiency is produced by changes in the diffusion elements.

The invention provides a desired level of both light reflection and light diffusion.

DETAILED DESCRIPTION OF THE INVENTION

Figure 1:
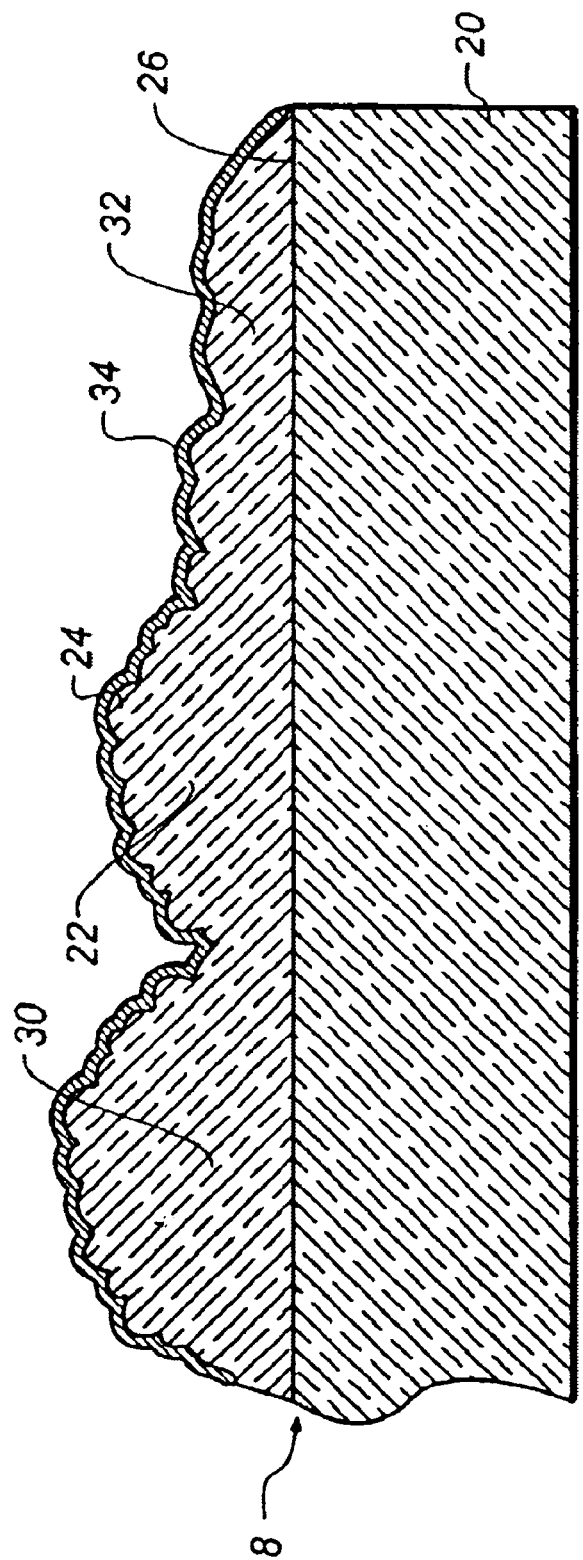
FIG. 1 illustrates a cross section of a variable reflection efficiency reflector with complex lens formed on a base material suitable for use in a liquid crystal display device.

The invention has numerous advantages over prior practices in the art. The invention provides diffuse reflection of light sources such as those that are commonly used in rear projection display devices such as liquid crystal display devices. The prior art reflection film, uniform reflectivity across the film surface, can not tailor the light reflection efficiency as a function of position on the film. The variable diffuse reflection film can be fitted to the light source and the display. The diffuse reflection efficiency is created to customize the reflection based on where the light source is located relative to the film. This provides diffuse reflection efficiency and transmission tuned for the areas of the display to maximize the brightness of the display. A tailored diffuse reflection film can be more diffuse close to the light source, to compensate for the light intensity of the light bulb and less diffusive away from the light source to create an even light intensity across the entire display. The invention provides more efficient use of light in back lit displays, such as a liquid crystal display because light in each area of the display only has to be diffused as much is necessary therefore letting as much light reflect as possible. Further, the invention, while providing diffuse reflection for the light sources, has a high light reflection rate.

The invention, while providing diffusion to the light sources, has a high light reflectivity rate. A high reflectivity rate for diffuse reflectors is particularly important for liquid crystal display devices. High reflectivity values allow the liquid crystal display to be brighter or while holding the level of brightness the same, it allows for the power consumption for the back light to be reduced therefore extending the lifetime of battery powered liquid crystal devices that are common for note book computers. The diffuse reflectors of the current invention can be easily changed to achieve the desired diffusion and reflectivity requirements for many liquid crystal devices thus allowing the invention materials to be responsive to the rapidly changing product requirements in the liquid crystal display market.

A voided polymer reflector and a complex lens surface reflector can be easily altered in both pre and post-manufacturing processes to achieve the desired variable diffuse reflection requirements for liquid crystal and other lighting requirements. These technologies allow the invention materials to be responsive to the rapidly changing product requirements in the liquid crystal display market.

Further, the light reflector with efficiency variation can create patterns, text, and pictures by reflecting light selectively to create areas of specular reflection, more diffuse reflection, and diffuse reflection. The reflection film of the present invention can be produced by using a conventional film-manufacturing facility in high productivity using roll to roll manufacturing processes. These and other advantages will be apparent from the detailed description below.

The term "LCD" means any rear projection display device that utilizes liquid crystals to form the image. The term "diffuser" means any material that is able to diffuse specular light (light with a primary direction) to a diffuse light (light with random light direction). The term "reflector" means any material that is able to reflect light. The term "diffuse reflector" means any material that is able to reflect and diffuse specular light (light with a primary direction) to a diffuse light (light with random light direction). The term "light" means visible light. The term "diffuse light transmission" means the percent diffusely transmitted light at 500 nm as compared to the total amount of light at 500 nm of the light source. The term "total light transmission" means percentage light transmitted through the sample at 500 nm as compared to the total amount of light at 500 nm of the light source. This includes both spectral and diffuse transmission of light. The term "diffuse reflected light" means the percent diffusely reflected light at 500 nm as compared to the total amount of light at 500 nm of the light source. The term "reflection efficiency" and "diffuse reflected light efficiency" means the percent diffuse transmitted light at 500 nm divided by the percent total transmitted light at 500 nm multiplied by a factor of 100. The term "polymeric film" means a film comprising polymers. The term "polymer" means homo- and co-polymers. The term "average", with respect to lens size and frequency, means the arithmetic mean over the entire film surface area.

"Transparent" means a film with total light transmission of 60% or greater at 500 nm. "In any direction", with respect to lenslet arrangement on a film, means any direction in the x and y plane. The term "pattern" means any predetermined arrangement whether regular or random.

"Macro reflection efficiency variation" means a diffuse reflection efficiency variation that is greater than 5% over an in plane distance of at least 2 cm. An optical gradient is a change in optical properties such as transmission, reflection, and light scattering direction as a function of distance from a stating point. Useful examples of an optical gradient include a light transmission gradient, a light diffusion gradient and light adsorption gradient. "Gradient", in reference to diffusion, means the increasing or decreasing of diffusion efficiency relative to distance from a starting point.

Better control and management of the back light are driving technological advances for liquid crystal displays (LCD). LCD screens and other electronic soft display media are back lit primarily with specular (highly directional) fluorescent tubes. Back reflection films are used to distribute the light evenly across the entire display area and change the light from specular to diffuse. The variable reflector of the present invention can replace the dot printing on the light guide in an LCD. Having a variable reflector with a diffuse reflectance gradient behind the light guide eliminates the need for the screen printed dots thus eliminating a processing step and saving manufacturing time and money.

In one embodiment of the invention, the reflection film has a textured surface on at least one side, in the form of a plurality of random microlenses, or lenslets. The term "lenslet" means a small lens, but for the purposes of the present discussion, the terms lens and lenslet may be taken to be the same. The lenslets overlap to form complex lenses. "Complex lenses" means a major lens having on the surface thereof multiple minor lenses. "Major lenses" mean larger lenslets that the minor lenses are formed randomly on top of "Minor lenses" mean lenses smaller than the major lenses that are formed on the major lenses. The plurality of lenses of all different sizes and shapes are formed on top of one another to create a complex lens feature resembling a cauliflower. The lenslets and complex lenses formed by the lenslets can be concave into the polymeric film or convex out of the base. The term "concave" means curved like the surface of a sphere with the exterior surface of the sphere closest to the surface of the film. The term "convex" means curved like the surface of a sphere with the interior surface of the sphere closest to the surface of the film. The term "top surface" means the surface of the film farther from the light source. The term "bottom surface" means the surface of the film closer to the light source.

One embodiment of the present invention could be likened to the moon's cratered surface. Asteroids that hit the moon form craters apart from other craters, that overlap a piece of another crater, that form within another crater, or that engulf another crater. As more craters are carved, the surface of the moon becomes a complexity of depressions like the complexity of lenses formed in the polymeric film.

The surface of each lenslet is a locally spherical segment, which acts as a miniature lens to alter the ray path of energy passing through or reflecting off the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the polymeric film and a radius of curvature relative to second axis (y) parallel to the polymeric film and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, skinner complex lens. The complex lenses may differ in size, shape, off-set from optical axis, and focal length.

The curvature, depth, size, spacing, materials of construction (which determines the basic refractive indices of the polymer film and the substrate), and positioning of the lenslets determine the degree of diffusion, and these parameters are established during manufacture according to the invention.

The divergence of light through the lens may be termed "asymmetric", which means that the divergence in the horizontal direction is different from the divergence in the vertical direction. The divergence curve is asymmetric, meaning that the direction of the peak light transmission is not along the direction $\theta=0°$, but is in a direction non-normal to the surface. There are at least three approaches available for making the light disperse asymmetrically from a lenslet diffusion film, namely, changing the dimension of the lenses in one direction relative to an orthogonal direction, off-setting the optical axis of the lens from the center of the lens, and using an astigmatic lens.

The result of using a diffusion film having lenses whose optical axes are off-set from the center of the respective lens results in dispersing light from the film in an asymmetric manner. It will be appreciated, however, that the lens surface may be formed so that the optical axis is off-set from the center of the lens in both the x and y directions.

The lenslet structure can be manufactured on the opposite sides of the substrate. The lenslet structures on either side of the support can vary in curvature, depth, size, spacing, and positioning of the lenslets.

The term "polymer" means homo- and co-polymers. The term microbead means polymeric spheres typically synthesized using the limited coalescence process. These microbead spheres can range in size from 0.2 to 30 micrometers. They are preferably in the range of 0.5 to 5.0 micrometers. The term microvoids means pores formed in an oriented polymeric film during stretching. These pores are initiated by inorganic particles, organic particles, or microbeads. The size of these voids is determined by the size of the particle or microbeads used to initiate the void and by the stretch ratio used to stretch the oriented polymeric film. The pores can range from 0.6 to 150 $\mu$ms in machine and cross machine directions of the film. They can range from 0.2 to 30 micrometers in height. Preferably the machine and cross machine direction pore size is in the range of 1.5 to 25 micrometers. Preferably the height of the pores is in the range of 0.5 to 5.0 micrometers. The term substantially circular means indicates a geometrical shape where the major axis is no more than two times the minor axis.

A light reflector comprising a macro reflection efficiency variation is preferred. It has been shown that the most efficient reflection films would have higher diffuse reflection values near the light sources to destruct the light source shape and less diffuse reflection away from the light source. A diffuse reflectance near the light source is subjected to the most intense, specular light and reflector diffuses it. Away from the light source, less diffusely reflective areas would not reflect the light as diffusely and the overall result would be an even light intensity across the reflection film. Having a light reflector with a macro reflection efficiency enables the reflector to tailor the diffusion and reflection properties as a function of location on the reflection film. In a back-lit display, when the back reflection film is tailored to the needs of the backlight(s), higher light reflection efficiency can be achieved. Further, a light reflector with macro efficiency variation can eliminate the need for edge printing on the diffusion film and dot printing on the acrylic light guide. These printing devices were to guide the light through back light of an LCD to be used more efficiently by the liquid crystal and to "hide" the light sources from the viewer. Further, the light reflector with efficiency variation can create patterns, text, and pictures by reflecting light selectively to create areas of specular reflection, diffusion reflection, and any amount of diffuse reflection in between.

A diffuse reflector wherein the reflection efficiency varies more than 5 percent in two different locations of the reflector is preferred. A reflection efficiency that varies less than 3 percent could be caused by variations in the reflection film caused by manufacturing process variations. Most preferred is a reflection efficiency that varies more than 50 percent in two different locations of the reflector. It has been shown that over 50 percent variation in two different locations of the reflector film produces a film that can be tailored to reflection needs of the backlight.

A diffuse reflector wherein the reflection efficiency variation comprises a gradient is preferred. Have a gradient allows for the smooth transition from one reflection efficiency to another reflection efficiency. For example, it is desirable to have more diffuse reflection by the light source because the light is more intense and specular in that region, however, it is not desirable for the viewer to see the transition from the specula to the diffuse regions in the reflection film. A gradient allows the reflection transition to be undetectable by the viewer. The reflection efficiency can change by the following mathematical variations, for example:

Reflection efficiency=$e^{1/distance}$ or $e^{-1/distance}$
Reflection efficiency=1/distance or −1/distance
Reflection efficiency=distance*x or −distance*x (where x is a real number)

Each specific light reflecting application determines the amount of variation needed and the rate at which reflection efficiency changes with respect to distance.

The diffuse reflection film is tailored to the light source to be diffused. Typically, to produce an evenly lit display, there need to be more diffuse reflectance near the light source and less further away from the light source. Where the light source is positioned in relation to the display determines what amount and type of variable reflector is needed. The preferred light reflector that is rectangle is shape has a reflection efficiency variation along a diagonal of the rectangle. This would be desirable to compensate for a lighting variation on a diagonal of a rectangle. In another embodiment of the invention, the preferred light reflector that is rectangular in shape has a reflection efficiency variation along the width or height of the rectangle. For another application, the preferred light reflector has a reflection efficiency variation from the center to the perimeter of the reflection film. Preferably, the light reflector has a reflection efficiency variation along the perimeter of the reflection film. The preferred light reflector has a reflection efficiency variation such that the iso-efficiency exhibits an elliptical pattern. The preferred light reflector has a reflection efficiency variation having a pattern. The variable reflector film can take on any of these variations based on the light source and display configuration.

For example, prior art light diffusers for liquid crystal display devices utilize edge or perimeter printing of the light diffuser to direct light away from the edges of the display were the light is typically absorbed into the LCD frame. Light adsorbed into the LCD frame is lost light energy in that absorbed illumination light energy can not be used to illuminate the LC image. Prior art diffusers for LCD devices are typically printed with white or silver, reflecting dots around the perimeter that provide specular reflection of perimeter light so that some of the perimeter light can be "recycled" by the illumination components away from the perimeter. While the printing of white reflective dots does reduce the amount of absorbed light energy by the LCD frame, perimeter printing is expensive in that it required an additional printing operation. Further, the perimeter printing of the light diffuser has been generally shown to reduce edge absorption by 30%. Using less diffuse region (a more specular region) around the perimeter of the reflection film, more of the light would be directed straight out of the backlight and into usable space on the display instead of being directed towards the edge of the display and being lost and therefore this variable reflector would replace the need for printing reflecting areas on the light diffusion films.

Preferably, the light reflector has a reflection efficiency variation having a specular component. Using pre or post-manufacturing processes, the reflection film can be selectively "turned on" or "turned off" meaning the areas can be diffuse, or specular. The specular areas of the film can form patterns and text. Films with areas of specular and diffuse light reflectance can be used in displays and decorations on mirrors having patterns or areas of specular and diffuse reflectance.

The preferred light reflector has a reflection efficiency variation of at least 10% less reflection efficiency on the edges of the reflection film than the center of the film. At the edge of a liquid crystal display, some of the light that is diffusely reflected is lost as it is deflected away and off the device. By making the edge of the display have more specular reflectivity than the center, less of the light is lost off of the display and the result is a brighter display. This can reduce or eliminate the need for edge printing on the diffusion film.

A diffuse reflector with at least one reflective layer and at least one film is preferred. This enables a multitude of reflection films to fit a number of applications. The amount of reflectivity can be independently tailored from diffusivity. Further, cost can be reduced compared to a single reflective film of the same thickness without reducing the reflectivity properties of the film.

One embodiment, the diffuse reflector having the reflective layer adhesively adhered to the bottom of the polymeric film, is preferred because the light is diffused twice as the reflector reflects it, as the light travels from the air through the polymeric complex lenses and after the light has been reflected as it exits the polymeric film through the complex lenses to the air. This embodiment is also well suited for manufacture in a photographic manufacturing system.

In another embodiment, the reflective layer is integral to the bottom of the polymeric film. This is preferred because the light is diffused twice as the reflector reflects it, as the light travels from the air through the polymeric complex lenses and after the light has been reflected as it exits the polymeric film through the complex lenses to the air. Because the reflection layer is integral to the polymeric base, it eliminates as adhesion step and the reflective layer can be in better optical contact with the polymer film.

Another embodiment where the reflective layer is integral to the top surface of the complex lenses is preferred. The reflection occurs at the surface of the complex lens film and is diffused by the reflective lenses on the surface. This is advantaged because the light is reflected off of the surface of the lenses instead of having to pass through multiple polymeric layers, making more efficient reflectivity. Another advantage is that the amount of reflectivity and diffusive reflectivity can be controlled by the thickness of the reflective layer on the surface of the complex lenses.

In another embodiment, the polymeric film is reflective. This is preferred because the lenses can be applied directly onto the reflective base thus eliminating the need for a separate polymeric film and a reflective film. Changing the geometry of the lenses applied to the reflective base can easily alter the amount of diffusion for the reflection.

Preferably, the reflective layer comprises metal. Metals, such as gold or silver, have very efficient reflectivity that when used in the reflector, increases the efficiency of the reflector. Metal also adds strength, hardness, and electrical conductivity properties to the reflection film.

In another embodiment, the reflective layer comprises an alloy. Using an alloy is preferred because the reflectance and mechanical properties can be tailored by using two or more metals with different properties.

In another embodiment, the reflective layer comprises an oxide, such as titanium dioxide. Oxides are preferred because they have high reflectivity and scattering properties. The scattering properties of increase the diffusion efficiency of the diffuse reflector film.

In another embodiment, the reflective layer comprises layer of polymer with differing indexes of refraction. The differing index of refraction between the layers creates a reflective film. This film could have tunable coloration, depending on the thicknesses of the layers and indexes of refraction and could add color to a display. More preferred is the reflective layer comprising more than 30 layers of polymer with differing indexes of refraction of 0.03 to 0.15. It has been shown that this number of layers and range of index of refraction optimizes the reflective nature of the film.

Preferably, the reflective layer has a thickness of 0.5 nanometers to 50 micrometers. A layer with thickness less than 0.5 nanometers is difficult to manufacture and thus cost prohibitive. A reflective layer thickness of over 50 micrometers does not give added reflectivity but does add cost because more material is required in the film. It has been shown that this range can deliver the desired reflectivity properties while minimizing material and manufacturing costs. Preferably, the diffuse reflector has a reflective layer with thickness of 0.5 to 50 nanometers. At this range the diffuse reflector becomes a diffuse transflector. The metallized coating is thin enough to reflect part of the incoming light and allow part of the light to be transmitted. This diffuse transflector can be used in a transflection device, such as a cell phone or PDA display.

Preferably, the reflective layer has a percent reflectivity of 50% or greater at 500 nm. At a reflectivity of less than 40%, the amount of light lost by the reflective layer (due to transmission or absorption) causes a display, such as a transmission, transflective, or reflective liquid crystal display, to become dark and difficult to see. Most preferred is a reflective layer with reflectivity of 94 percent or greater at 500 nm because the high reflectivity creates a bright display. This high reflectivity can either make a transmission-type display brighter or be used to extend battery life. It can make a reflective-type display brighter and easier to read in all lighting situations.

Preferably, the reflective layer has a resistivity of 0.03 to 1800 ohms per square. This range has been shown to be optimal for electrostatic printing. If the reflective layer had a resistively of 2000 ohms per square or greater and a charge was placed on the layer, the layer would heat because of inefficient electricity transfer.

A light reflection film having a top and bottom surface comprising a plurality of convex or concave complex lenses on the surface of a base is preferred. Curved concave and convex polymer lenses have been shown to provide very efficient diffuse reflection of light. Further, the complex lenses can be altered in design or a post processing method to achieve a macro reflection efficiency variation.

In another embodiment, the convex or concave lenses are reflective. The reflection occurs at the surface of the complex lens film and is diffused by the reflective lenses on the surface. This is advantaged because the light is reflected off of the surface of the lenses instead of having to pass through multiple polymeric layers, making reflectivity more efficient. Another advantage is that the amount of reflectivity and diffusive reflectivity can be controlled by the geometry of the lenses and the thickness of the of the complex lenses layer.

The concave or complex lenses on the surface of the polymer film are preferably randomly placed. Random placement of lenses increases the diffusion efficiency of the invention materials. Further, by avoiding a concave or convex placement of lenses that is ordered, undesirable optical interference patterns are avoided.

In an embodiment of the invention, the concave or convex lenses are located on both sides of the base. By placing the lenses on both sides of the base, more efficient light diffusion is observed compared to the lenses of the invention on one side. Further, the placement of the lenses on both sides of the base increases the focal length of the lenses furthest from the brightness enhancement film in a LC display device. Further, the reflection efficiency and reflection variation can vary from one side of the reflection film to the other side.

Preferably, the concave or convex lenses have an average frequency in any direction of from 5 to 250 complex lenses/mm. When a film has an average of 285 complex lenses/mm, the width of the lenses approaches the wavelength of light. The lenses will impart a color to the light passing through the lenses and change the color temperature of the display. Less than 4 lenses/mm Creates lenses that are too large and therefore diffuse the light less efficiently. Concave or convex lenses with an average frequency in any direction of between 22 and 66 complex lenses/mm are more preferred. It has been shown that an average frequency of between 22 and 66 complex lenses provide efficient light diffusion and can be efficiently manufactured utilizing cast coated polymer against a randomly patterned roll.

The light reflector has concave or convex lenses at an average width between 3 and 60 microns in the x and y direction. When lenses have sizes below 1 micron the lenses impart a color shift in the light passing through because the lenses dimensions are on the order of the wavelength of light. When the lenses have an average width in the x or y direction of more than 68 microns, the lenses is too large to diffuse the light efficiently. More preferred, the concave or convex lenses at an average width between 15 and 40 microns in the x and y direction. This size lenses has been shown to create the most efficient diffusion.

The concave or convex complex lenses comprising minor lenses wherein the width in the x and y direction of the smaller lenses is preferably between 2 and 20 microns. When minor lenses have sizes below 1 micron the lenses impart a color shift in the light passing through because the lenses dimensions are on the order of the wavelength of light. When the minor lenses have sizes above 25 microns, the diffuse reflection efficiency is decreased because the complexity of the lenses is reduced. More preferred are the minor lenses having a width in the x and y direction between 3 and 8 microns. This range has been shown to create the most efficient diffusion.

The convex or concave lenses preferably have a height/diameter ratio of from 0.03 to 1.0. A height/diameter ratio of less than 0.01 (very wide and shallow lenses) limits diffusion because the lenses do not have enough curvature to efficiently spread the light. A height/diameter ratio of greater than 2.5 creates lenses where the angle between the side of the lenses and the substrate is large. This causes internal reflection limiting the diffusion capability of the lenses. Most preferred is a height/diameter of the convex or concave lenses of from 0.25 to 0.48. It has been found that the most efficient diffusion occurs in this range.

The number of minor lenses per major lens is preferably from 2 to 60. When a major lens has one or no minor lenses, its complexity is reduced and therefore it does not diffuse as efficiently. When a major lens has more than 70 minor lens contained on it, the width of some of the minor lens approaches the wavelength of light and imparts a color to the light transmitted. Most preferred are from 5 to 18 minor lenses per major lens. This range has been shown to produce the most efficient diffusion.

Preferably, the concave or convex lenses are semi-spherical meaning that the surface of each lenslet is a sector of a sphere, but not necessarily a hemisphere. This provides excellent even diffusion over the x-y plane. The semi-spherical shaped lenses scatter the incident light uniformly, ideal for a backlit display application where the display area needs to be lit uniformly. In another embodiment of the invention, the concave or convex lenses are aspherical meaning that width of the lenses differ in the x and y direction. This scatters light selectively over the x-y plane. For example, a particular x-y aspect ratio might produce an elliptical scattering pattern. This would be useful in the front of a LC display, spreading the light more in the horizontal direction than the vertical direction for increased viewing angle.

Preferably, the concave or convex complex lenses comprise an olefin repeating unit. Polyolefins are low in cost and high in light transmission. Further, polyolefin polymers are efficiently melt extrudable and therefore can be used to create light reflectors in roll form.

In another embodiment of the invention, the concave or convex complex lenses comprise a carbonate repeating unit. Polycarbonates have high optical transmission values that allow for high light transmission and diffusion. High light transmission provides for a brighter LC device than diffusion materials that have low light transmission values.

In another embodiment of the invention, the concave or convex complex lenses comprise an ester repeating unit. Polyesters are low in cost and have good strength and surface properties. Further, polyester polymer is dimensionally stable at temperatures between 80 and 200 degrees C. and therefore can withstand the heat generated by display light sources.

Preferably, the polymeric support comprises an ester repeating unit. Polyesters are low in cost and have good strength and surface properties. Further, polyester polymer film is dimensionally stable over the current range of temperatures encountered in enclosed display devices. Polyester polymer easily fractures allowing for die cutting of reflection films for insertion into display devices.

In another embodiment of the polymeric film, the polymeric support comprises a carbonate repeating unit. Polycarbonates have high optical transmission values compared to polyolefin polymers and therefore can improve the brightness of display devices.

In another embodiment of the invention, the polymeric support comprises an olefin repeating unit. Polyolefins are low in cost and have good strength and surface properties.

In another embodiment of the invention the polymeric support comprises a cellulose acetate. Tri acetyl cellulose has both high optical transmission and low optical birefringence allowing the reflector of the invention to both diffusely reflect light and reduce unwanted optical patterns.

The thickness of the light reflector preferably is not more than 250 micrometers or more preferably from 12.5 to 100 micrometers. Current design trends for LC devices are toward lighter and thinner devices. By reducing the thickness of the light reflector to not more than 250 micrometers, the LC devices can be made lighter and thinner. Further, by reducing the thickness of the light reflector, brightness of the LC device can be improved by reducing light transmission. The more preferred thickness of the light reflector is from 12.5 to 100 micrometers which further allows the light reflector to be conveniently combined with a other optical materials in an LC device such as brightness enhancement films. Further, by reducing the thickness of the light reflector, the materials content of the reflector is reduced.

Since the thermoplastic light reflector of the invention typically is used in combination with other optical web materials, a light reflector with an elastic modulus greater than 500 MPa is preferred. An elastic modulus greater than 500 MPa allows for the light reflector to be laminated with a pressure sensitive adhesive for combination with other optical webs materials. Further, because the light reflector is mechanically tough, the light reflector is better able to withstand the rigors of the assembly process compared to prior art cast diffusion films which are delicate and difficult to assemble. A light reflector with an impact resistance greater than 0.6 GPa is preferred. An impact resistance greater than 0.6 GPa allows the light reflector to resist scratching and mechanical deformation that can cause unwanted uneven diffusion of the light causing "hot" spots in an LC device.

The light reflector of the present invention can be produced by using a conventional film-manufacturing facility in high productivity. The invention utilizes a voided thermal plastic layer containing microvoids. Microvoids of air in a polymer matrix are preferred and have been shown to be a very efficient diffuser of light in a diffuse reflector compared to prior art diffuser materials in reflectors which rely on surface roughness on a polymer sheet to create light diffusion and diffuse reflectance for LCD devices. The microvoided layers containing air have a large index of refraction difference between the air contained in the voids (n=1) and the polymer matrix (n=1.2 to 1.8). This large index of refraction difference provides excellent diffusion and high light transmission which allows the LCD image to be brighter and/or the power requirements for the light to be reduced thus extending the life of a battery. Further, the microvoided reflector film can be altered pre or post manufacturing to achieve the macro reflection efficiency variation.

Since the microvoids of the invention are substantially air, the index of refraction of the air containing voids is 1. An index of refraction difference between the air void and the thermoplastic matrix is preferably greater than 0.2. An index of refraction difference greater than 0.2 has been shown to provide excellent diffusion of LCD back light sources and a index of refraction difference of greater than 0.2 allows for bulk diffusion in a thin film which allows LCD manufacturers to reduce the thickness of the LC screen. The thermoplastic diffusion layer preferably contains at least 4 index of refraction changes greater than 0.2 in the vertical direction. Greater than 4 index of refraction changes have been shown to provide enough diffusion for most LC devices. 30 or more index of refraction differences in the vertical direction, while providing excellent diffusion, significantly reduces the amount of transmitted light, significantly reducing the brightness of the LC device.

Substantially circular voids, or voids whose major axis to minor axis is between 2.0 and 0.5 are preferred as substantially circular voids have been shown to provide efficient diffusion of light energy and reduce uneven diffusion of light energy. A major axis diameter to minor axis diameter ratio of less than 2.0 is preferred. A ratio less than 2.0 has been shown to provide excellent diffusion of LC light sources. Further, a ratio greater than 3.0 yields voids that are spherical and spherical voids have been shown to provide uneven dispersion of light. A ratio between 1.0 and 1.6 is most preferred as light diffusion and light transmission is optimized.

The light reflector preferably comprises surface diffuser. A surface diffuser is easily altered in pre and post-manufacture processes to achieve a macro diffusion and reflection efficiency variation. Further, a surface diffuser utilizes with its rough surface exposed to air, affording the largest possible difference in index of refraction between the material of the diffuser and the surrounding medium and, consequently, the largest angular spread for incident light and very efficient spreading of incident light.

In another embodiment of the invention, a bulk diffuser is preferred to create a diffuse reflector. A bulk diffuser can be manufactured with a macro reflection efficiency variation, or can be subjected to a post-manufacturing process to produce the variation. Further, the bulk diffuser relies on index of refraction changes through the film, not needing an air interface to work efficiently.

The light reflector comprising a surface microstructure is preferred. A surface microstructure is easily altered in design of the surface structures and altered in a post-manufacture process to achieve a macro reflection efficiency variation. Microstructures can be tuned for different diffuse reflection efficiencies and how much they spread light. Examples of microstructures are a simple or complex lenses, prisms, pyramids, and cubes. The shape, geometry, and size of the microstructures can be changed to accomplish the desired diffuse reflection. A surface diffuser utilizes with its rough surface exposed to air, affording the largest possible difference in index of refraction between the material of the diffuser and the surrounding medium and, consequently, the largest angular spread for incident light and very efficient diffuse reflection.

The diffuse reflector comprising a colored element is preferred. This colored element can produce colored reflections or correct the coloration of the light source. Or example, if a display required neutral colored light and the light source used was blue in color, a yellow colored element could be added to the diffuse reflector so that the reflections off of the diffuse reflector would be neutral and more suited to the display. "Colored element" means any colored material. These colored elements could be, for example: dyes, pigments, or thin layers of materials.

An example of creating a colored reflective element is using a thermal print head with just a carrier sheet with coloration dyes or pigments. The printer head heats the polymer sheet and supplies pressure to transfer the colored element.

A diffuse reflector wherein the macro reflection efficiency variation comprises chromatic reflection is preferred. To obtain chromatic reflection, different wavelengths that compose white light are affected differently by refraction. For example, the red radiations (with longer wavelengths) are less deviated while the blue or violet radiations are more deviated from their initial direction and this creates a chromatic reflection.

The diffuse reflector wherein the chromatic reflection comprises yellow light at 570 to 620 nm is preferred. In another embodiment of the invention, the chromatic reflection comprises magenta light at 630 to 690 nm and 425 to 480 nm is preferred. Preferably, the chromatic reflection comprises cyan light at 480 to 520 nm. In another embodiment of the invention, the chromatic reflection comprises red light at 630 to 690 nm. The preferred diffuse reflector comprises green light at 525 to 590 nm. For another application, the preferred diffuse reflector comprises blue light at 425 to 480 nm. The desired chromatic reflection color depends on the application and use.

There are two main ways to produce a variable diffusion film, either a pre-manufacturing or a post-manufacturing process step. The total amount of reflection, whether 90% or 50%, does not change the diffuse reflection efficiency. The percent reflection efficiency depends on what percentage of the total reflection is diffused and that is set by the diffusion elements of the reflector rather than the amount of total reflection.

A post-manufacturing process to provide a diffuse reflector with a selectively modified light reflection efficiency is preferred. Post-manufacturing, the complex lens, voided polymer, or surface texture can be altered using heat and/or pressure. The process where a heat and/or pressure gradient or pattern is preferred to produce a variable reflection film. When heat is applied to a polymeric film, the polymer diffusion element partially or fully melts and cools to form a new structure. In the case of the complex lens surface, heat will melt the polymer lenses and will reform to create new shaped lenses or a smooth polymer surface (the reflective element if in the diffusion element or on top of the diffusion element follows the diffusion element reshaping). This smooth polymer film and reflective layer reflects light specularly. Heat is a way to selectively turn parts of the reflector sheet into a partially diffuse or specular reflector and can be applied in a very precise way to create specular dots, lines, patterns, and text. Heat applied to a voided polymer will melt the polymer and close the voids to the extent at which the heat is applied. The voids can be partially melted and less diffusely reflective, or melted completely creating a specular reflection region in the bulk voided polymer. The post manufacturing process can be applied before or after the reflective element of the reflector is applied.

Pressure can also be used to modify the reflective properties of selective areas of the diffuse reflective film. Post-manufacturing, the complex lens, bulk voided polymer, or surface texture can be altered using pressure. The process of applying a pressure gradient or pattern is preferred to produce a variable diffuse reflectance film. When pressure is applied to a polymeric film, the polymer diffusion element partially or fully compresses to form a new structure. In the case of the complex lens surface, the pressure will compress the polymer lenses (and the reflective element if in the diffusion element or on top of the diffusion element follows the diffusion element reshaping) and will reform them to create new flatter lenses (partially diffuse) or a smooth polymer surface (specular). This smooth polymer film and reflective layer is almost all specular. The amount of pressure needed to alter the diffusion elements depends on the materials (polymer) used and the thickness of the reflector. Pressure is a way to selectively turn parts of the diffusely reflective sheets into a specular reflection sheets and can be applied in a very precise way to create specular dots, lines, patterns, and text. Pressure applied to a voided polymer will compress the polymer and close the voids depending on how much pressure is applied. The voids can be partially closed and less diffuse, or closed completely creating a specular region in the bulk voided diffuse reflector. Post-manufacture, heat and pressure together or separately can selectively alter the reflection characteristics of the diffusion films varying from diffuse to specular.

An example of a post-manufacturing process is using a thermal print head (heat and pressure) to melt the low $T_g$ complex lenses on a complex lens diffuse reflector. As the printer prints, with just a carrier sheet with no coloration dyes or pigments, the printer head heats the polymer sheet and supplies pressure to deform or completely melt the complex lens. The resolution of the areas of diffuse, semi-diffuse and specular reflectance depends on the resolution of the print head.

Pre-manufacturing processes that alter the diffuse reflection characteristics of reflection films selectively with respect to location by changing the diffusion elements, such as, complex lens, bulk voided polymer, or surface texture are preferred. Pre-manufacturing processes to alter reflection efficiencies of complex lenses are changes in the size, aspect ratio, frequency and complexity of the complex lenses. This is achieved by changing the complex lens pattern on the master chill roll. The chill roll is produced from bead or particle blasting and then chroming. Varying the bead or particle blasting (size, number of particles, velocity of particles, etc) or by varying the chroming process selectively on the chill roll surface produces a master chill roll with macro reflection efficiency variation. This variation can be from the most diffuse reflection to no diffuse reflection where a specular reflective region of the film would be produced. (To produce a specular region in the film the chill roll would be flat or have no surface structure to it.) This pre-manufacturing process can create diffusion gradients, patterns, or even text.

Pre-manufacturing processes can alter the reflection characteristics of voided diffuse reflection films selectively with respect to location by changing the diffusion elements voids in the bulk voided polymer. Thickness of the voided layer and void attributes are two parameters to change the diffuse reflection efficiency in the voided polymer. The voided layer thickness can be extruded in varying thickness across the reflection sheet or can be stretched more in selective areas than others. These thickness differences cause macro reflection efficiency variation. Void characteristics can also be altered pre-manufacturing to develop reflection efficiency changes. For example, the size of the void initiating bead can vary from location to location causing different sized voids. The concentration of void initiating beads can also be tailored around the reflection sheet to create more voids in certain areas than other areas.

In other surface reflectors, the pattern on the master roll can be tailored in selective areas to create more diffuse and more specular reflectance areas. In the case of beads coated in a matrix, the beads that are coated could vary in size or concentration. For example, while coating, larger beads could be pumped into the coating station, or a gradient of sizes or concentrations of beads could be coated across the web creating a reflection efficiency gradient.

FIG. 1 illustrates a cross section of a variable light reflection film suitable for use in a liquid crystal display device. Variable light reflection film 8 comprises transparent polymer base 20, onto which major lenses 22 are applied to the surface of transparent polymer base 26. Minor lenses 24 are on the surface of the major lens 22. Intricate complex lens 30 has a larger height to width ratio and has more minor lenses per major lens than simpler complex lens 32, which has a smaller height to width ratio and has less minor lenses per major lens. These variations in the geometry and number of minor lenses per major lens, along with frequency of complex lenses, produce the macro diffusion efficiency variation. The aluminum coating 34 is applied to the surface of the complex lenses. The invention comprises a plurality of minor lenses 24 on the surface of the major lens 22. The light reflector of the invention contains many diffusion surfaces from the major lens 22 and the minor lenses 24.

Figure 2:
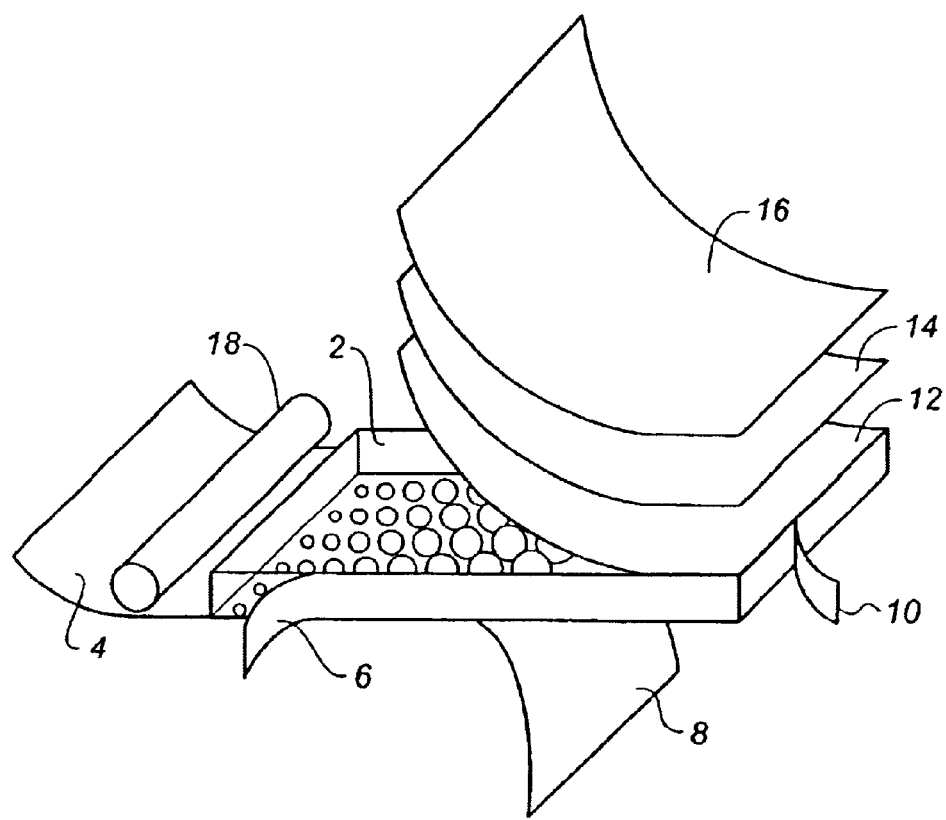
FIG. 2 illustrates a liquid crystal display device with a variable reflection efficiency light reflector.

FIG. 2 illustrates a liquid crystal display device with a variable light reflection film 8. Visible light source 18 is illuminated and light is guided into light guide 2. Lamp reflector 4 is used to direct light energy into the light guide 2, represented by an acrylic box. Reflection tape 6, reflection tape 10 and variable light reflection film 8 are utilized to keep light energy from exiting the light guide 2 in an unwanted direction. The light diffusion film 12 is utilized to diffuse light energy exiting the light guide in a direction perpendicular to the light diffusion film. Brightness enhancement film 14 is utilized to focus the light energy into polarization film 16. The light diffusion film 12 is in contact with brightness enhancement film 14.

Figure 3:
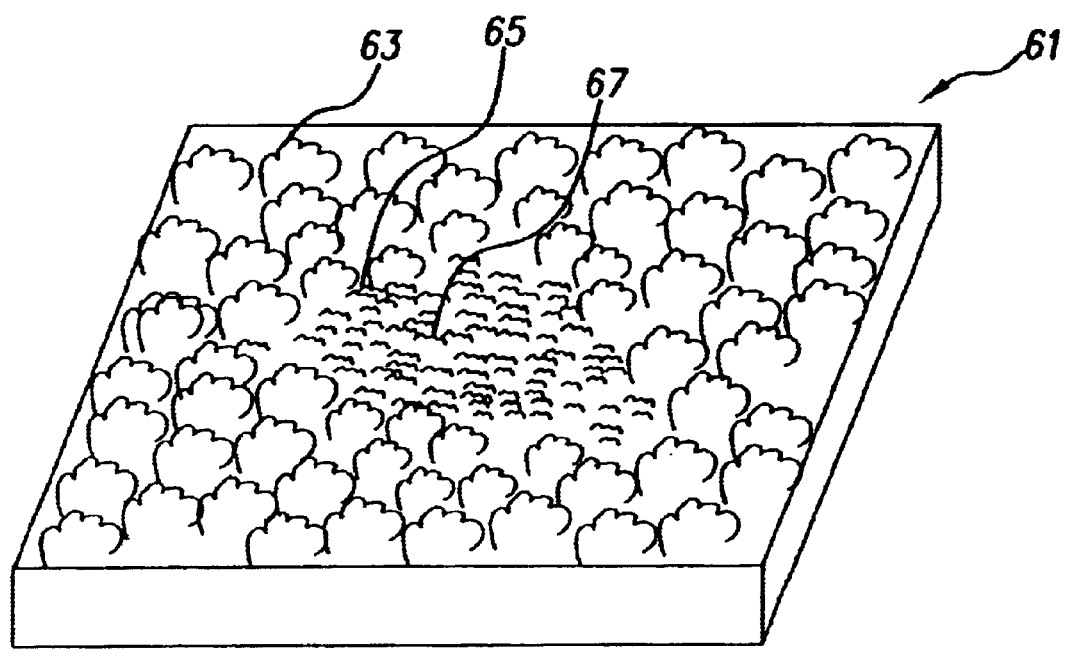
FIG. 3 is a schematic of a film with reflection efficiency variation having iso-efficiency areas that exhibit an elliptical pattern.

FIG. 3 shows a schematic of a film with reflection efficiency variation with iso-efficiency areas that exhibit an elliptical pattern 61, 63, 65, and 67 show areas of iso-reflection efficiency that are elliptical in nature. In this figure, the outer areas of the film are the most diffusely reflective and become less diffusely reflective towards the center of the film.

Figure 4:
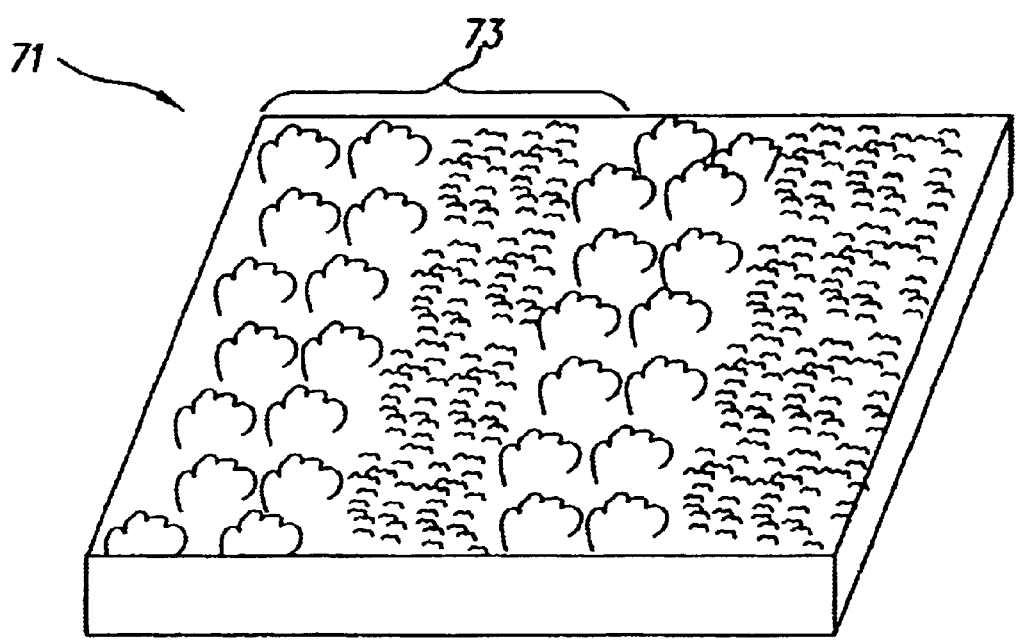
FIG. 4 is a schematic of a film with reflection efficiency variation having a repeating pattern.

FIG. 4 shows a schematic of a film with reflection efficiency variation comprising a repeating pattern. The film with reflection efficiency variation comprising a repeating pattern 71, comprises a pattern of reflection efficiency variation 73.

Figure 5:
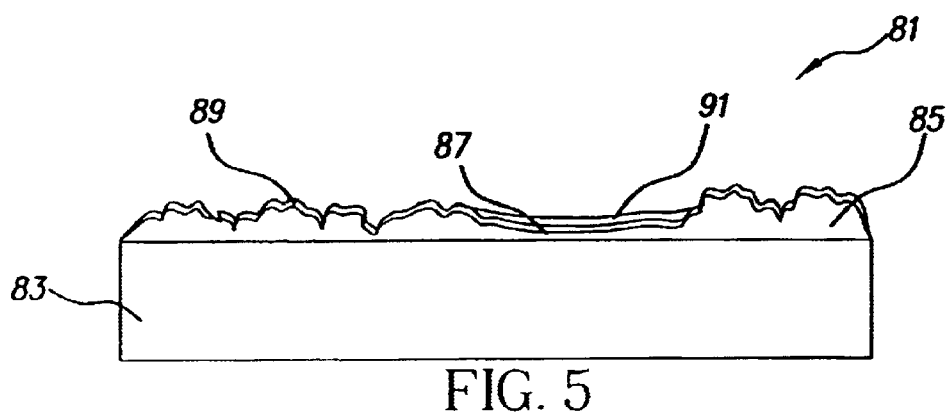
FIG. 5 is a schematic of a light reflector with variable diffuse light reflection comprising a colored element.

FIG. 5 is a schematic of a cross section of a variable light reflection film comprising a colored element suitable for use in a liquid crystal display device. Variable light reflection film with colored areas 81 comprises transparent polymer base 83, onto which complex lenses 85 are applied to the surface of transparent polymer base 83. The area of flattened lenses 87 causes more specular reflection. The aluminum coating 89 is applied to the surface of the complex lenses 85 and flattened lenses 87. A colorant 91 is added, that can be applied many different ways including thermal, ink jet or gravure printing to form a colored area on the specular reflective metallized flattened lenses.

For the light reflector of the invention, micro-voided composite biaxially oriented polyolefin sheets are preferred and are manufactured by co-extrusion of the core and surface layer(s), followed by biaxial orientation, whereby voids are formed around void-initiating material contained in the core layer. For the biaxially oriented layer, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polyethylene is preferred, as it is low in cost and has desirable strength properties. Such composite sheets are disclosed in, for example, U.S. Pat. Nos. 4,377,616; 4,758,462 and 4,632,869, the disclosure of which is incorporated for reference. The light reflector film comprises a polymer sheet with at least one voided polymer layer and could contain nonvoided polyester polymer layer(s). It should comprise a void space between about 2 and 60% by volume of said voided layer of said polymer sheet. Such a void concentration is desirable to optimize the transmission and reflective properties while providing adequate diffusing power to hide back lights and filaments. The thickness of the micro void-containing oriented film of the present invention is preferably about 1 micrometer to 400 micrometer, more preferably 5 micrometer to 200 micrometer.

The light reflector of the invention is preferably provided with a one or more nonvoided skin layers adjacent to the microvoided layer. The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core. Any suitable polyester sheet may be utilized for the member provided that it is oriented. The orientation provides added strength to the multi-layer structure that provides enhanced handling properties when displays are assembled. Microvoided oriented sheets are preferred because the voids provide opacity without the use of $TiO_2$. Microvoided layers are conveniently manufactured by co-extrusion of the core and thin layers, followed by biaxial orientation, whereby voids are formed around void-initiating material contained in the thin layers.

Polyester microvoided light reflectors are also preferred as oriented polyester has excellent strength, impact resistance and chemical resistance. The polyester utilized in the invention should have a glass transition temperature between about 50.degree. C. and about 150.degree. C., preferably about 60–100.degree. C., should be orientable, and have an intrinsic viscosity of at least 0.50, preferably 0.6 to 0.9. Suitable polyesters include those produced from aromatic, aliphatic, or cyclo-aliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoiso-phthalic, and mixtures thereof. Examples of suitable glycols include ethylene glycol, propylene glycol, butanediol, pentanediol, hexanediol, 1,4-cyclohexane-dimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Polypropylene is also useful. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607; 4,459,402; and 4,468,510.

The co-extrusion, quenching, orienting, and heat setting of polyester reflector sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

Additional layers preferably are added to reflection film that may achieve a different effect. Such layers might contain tints, antistatic materials, or different void-making materials to produce sheets of unique properties. Biaxially oriented sheets could be formed with surface layers that would provide an improved adhesion. The biaxially oriented extrusion could be carried out with as many as 10 layers if desired to achieve some particular desired property.

Addenda are preferably added to a polyester skin layer to change the color of the imaging element. Colored pigments that can resist extrusion temperatures greater than 320 degrees Celsius are preferred, as temperatures greater than 320 degrees Celsius are necessary for co-extrusion of the skin layer.

Addenda of this invention could be an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylamino-coumarin, 1-4-Bis (O-Cyanostyryl) Benzol and 2-Amino-4-Methyl Phenol. An unexpected desirable feature of this efficient use of optical brightener. Because the ultraviolet source for a transmission display material is on the opposite side of the image, the ultraviolet light intensity is not reduced by ultraviolet filters common to imaging layers. The result is less optical brightener is required to achieve the desired background color.

The polyester light reflector may be coated or treated after the co-extrusion and orienting process or between casting and full orientation with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion. By having at least one nonvoided skin on the micro-voided core, the tensile strength of the sheet is increased and makes it more manufacturable. It allows the sheets to be made at wider widths and higher draw ratios than when sheets are made with all layers voided. The non-voided layer(s) can be peeled off after manufacture of the film. Co-extruding the layers further simplifies the manufacturing process.

The light reflector of the present invention may be used in combination with one or more layers selected from an optical compensation film, a polarizing film and a substrate constitution a liquid crystal layer. The oriented film of the present invention is preferably used by a combination of oriented film/polarizing film/optical compensation film in the order. In the case of using the above films in combination in a liquid crystal display device, the films are preferably bonded with each other e.g. through a tacky adhesive for minimizing the reflection loss, etc. The tacky adhesive is preferably those having a refractive index close to that of the oriented film to suppress the interfacial reflection loss of light. A pressure or heat sensitive adhesive may be applied to the reflector.

The light reflection of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyarylate and triacetyl cellulose. The light reflector may be mounted to a glass sheet for support.

The light reflector of the present invention may be incorporated with e.g. an additive or a lubricant such as silica for improving the drawability and the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or $\Delta$ metal oxide or a filler.

The light reflector of the present invention usually has optical anisotropy. A biaxially drawn film of a thermoplastic polymer is generally an optically anisotropic material exhibiting optical anisotropy having an optic axis in the drawing direction. The optical anisotropy is expressed by the product of the film thickness d and the birefringence $\Delta n$ which is a difference between the refractive index in the slow optic axis direction and the refractive index in the fast optic axis direction in the plane of the film, i.e. $\Delta n*d$ (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of $\Delta n.*d$ since the level depends upon the application of the film, however, it is preferably 50 nm or more.

The microvoid-containing oriented film of the present invention has a function to diffusely reflect the light. A periodically varying refractive index distribution formed by these numerous microvoids and micro-lens formed by the micro voided forms a structure like a diffraction grating to contribute to the optical property to scatter the light. The voided thermoplastic reflection sheet provides excellent scattering of light while having a high % light transmission. "Void" is used herein to mean devoid of added solid and liquid matter, although it is likely the "voids" contain gas. The void-initiating particles which remain in the finished packaging sheet core should be from 0.1 to 10 micrometers in diameter, preferably round in shape, to produce voids of the desired shape and size. Voids resulting from the use of initiating particles of this size are termed "microvoids" herein. The voids exhibit a dimension of 10 micrometers or less in the unoriented thickness or Z direction of the layer. The size of the void is also dependent on the degree of orientation in the machine and transverse directions. Ideally, the void would assume a shape that is defined by two opposed and edge contacting concave disks. In other words, the voids tend to have a substantially circular cross section in the plane perpendicular to the direction of the light energy (also termed the vertical direction herein). The voids are oriented so that the two major dimensions (major axis and minor axis) are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

Microvoids formed from organic spheres are preferred because they are low in light scattering, have been shown to form substantially circular voids and are easily dispersed in polyester. Further, the size and the shape of the voided diffuser layer can be changed by proper selection of organic sphere size and amount. Microvoids that are substantially free of scattering inorganic particles is also preferred. Prior art voided polymer layers that use inorganic particles such as clay, $TiO_2$ and silica have been shown to unacceptably scatter visible light energy. Scattering light energy from the back light source reduces the efficiency of the display unit by scattering light energy away from the LC and back toward the light source. It has been shown that inorganic microvoiding particles can cause as much as 8% loss in transmitted light energy.

A microvoid is a void in the polymer layer of the diffuse reflector that has a volume less than 100 micrometers. Microvoids larger than 100 micrometers are capable of diffusing visible light, however, because the void size is large, uneven diffusion of the light occurs resulting in uneven lighting of display devices. A thermoplastic microvoid volume between 8 and 42 cubic micrometers is preferred. A microvoided volume less than 6 cubic micrometers is difficult to obtain as the voiding agent required for 6 cubic micrometers is to small to void with typical 3×3 orientation of polyester. A microvoid volume greater than 50 cubic micrometers, while providing diffusion, creates a thick diffusion layer requiring extra material and cost. The most preferred void volume for the thermoplastic reflector is between 10 and 20 cubic micrometers. Between 10 and 20 cubic micrometers has been shown to provide excellent diffusion and diffuse reflection properties.

The organic void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is pre-shaped and blended into the matrix polymer, the important characteristic is the size and shape of the particles. Spheres are preferred and they can be hollow or solid. These spheres may be made from cross-linked polymers which include members selected from the group consisting of an alkenyl aromatic compound having the general formula $Ar-C(R)=CH_2$, wherein Ar represents an aromatic hydrocarbon radical, or an aromatic halohydrocarbon radical of the benzene series and R is hydrogen or the methyl radical; acrylate-type monomers including monomers of the formula $CH_2=C(R')C(O)(OR)$ wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula $CH_2=CH(O)COR$, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

Preferred crosslinked polymer beads have a mean particle size less than 2.0 micrometers, more preferably between 0.3 and 1.7 micrometers. Crosslinked polymer beads smaller than 0.3 micrometers are prohibitively expensive. Crosslinked polymer beads larger than 1.7 micrometers make voids that large and do not scatter light efficiently.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, arylamidomethyl-propane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening to produce beads spanning the range of the original distribution of sizes. Other processes such as suspension polymerization and limited coalescence directly yield very uniformly sized particles. U.S. Pat. No. 6,074,788, the disclosure of which is incorporated for reference. It is preferred to use the "limited coalescence" technique for producing the coated, cross-linked polymer microbeads. This process is described in detail in U.S. Pat. No. 3,615,972. Preparation of the coated microbeads for use in the present invention does not utilize a blowing agent as described in this patent, however. Suitable slip agents or lubricants include colloidal silica, colloidal alumina, and metal oxides such as tin oxide and aluminum oxide. The preferred slip agents are colloidal silica and alumina, most preferably, silica. The cross-linked polymer having a coating of slip agent may be prepared by procedures well known in the art. For example, conventional suspension polymerization processes wherein the slip agent is added to the suspension is preferred. As the slip agent, colloidal silica is preferred.

The microbeads of cross-linked polymer range in size from 0.1–50 $\mu$m, and are present in an amount of 5–50% by weight based on the weight of the polyester. Microbeads of polystyrene should have a Tg of at least 20° C. higher than the Tg of the continuous matrix polymer and are hard compared to the continuous matrix polymer.

Elasticity and resiliency of the microbeads generally result in increased voiding, and it is preferred to have the Tg of the microbeads as high above that of the matrix polymer as possible to avoid deformation during orientation. It is not believed that there is a practical advantage to cross-linking above the point of resiliency and elasticity of the microbeads.

The microbeads of cross-linked polymer are at least partially bordered by voids. The void space in the supports should occupy 2–60%, preferably 30–50%, by volume of the film support. Depending on the manner in which the supports are made, the voids may completely encircle the microbeads, e.g., a void may be in the shape of a doughnut (or flattened doughnut) encircling a micro-bead, or the voids may only partially border the microbeads, e.g., a pair of voids may border a microbead on opposite sides.

During stretching the voids assume characteristic shapes from the balanced biaxial orientation of films to the uniaxial orientation of microvoided films. Balanced microvoids are largely circular in the plane of orientation. The size of the microvoids and the ultimate physical properties depend upon the degree and balance of the orientation, temperature and rate of stretching, crystallization kinetics, the size distribution of the microbeads, and the like. The film supports according to this invention are prepared by: (a) forming a mixture of molten continuous matrix polymer and cross-linked polymer wherein the cross-linked polymer is a multiplicity of microbeads uniformly dispersed throughout the matrix polymer, the matrix polymer being as described hereinbefore, the cross-linked polymer microbeads being as described hereinbefore, (b) forming a film support from the mixture by extrusion or casting, (c) orienting the article by stretching to form microbeads of cross-linked polymer uniformly distributed throughout the article and voids at least partially bordering the microbeads on sides thereof in the direction, or directions of orientation.

Methods of bilaterally orienting sheet or film material are well known in the art. Basically, such methods comprise stretching the sheet or film at least in the machine or longitudinal direction after it is cast or extruded an amount of about 1.5–10 times its original dimension. Such sheet or film may also be stretched in the transverse or cross-machine direction by apparatus and methods well known in the art, in amounts of generally 1.5–10 (usually 3–4 for polyesters and 6–10 for polypropylene) times the original dimension. Such apparatus and methods are well known in the art and are described in such U.S. Pat. No. 3,903,234.

The voids, or void spaces, referred to herein surrounding the microbeads are formed as the continuous matrix polymer is stretched at a temperature above the Tg of the matrix polymer. The microbeads of cross-linked polymer are relatively hard compared to the continuous matrix polymer. Also, due to the incompatibility and immiscibility between the microbead and the matrix polymer, the continuous matrix polymer slides over the microbeads as it is stretched, causing voids to be formed at the sides in the direction or directions of stretch, which voids elongate as the matrix polymer continues to be stretched. Thus, the final size and shape of the voids depends on the direction(s) and amount of stretching. If stretching is only in one direction, microvoids will form at the sides of the microbeads in the direction of stretching. If stretching is in two directions (bidirectional stretching), in effect such stretching has vector components extending radially from any given position to result in a doughnut-shaped void surrounding each microbead.

The preferred preform stretching operation simultaneously opens the microvoids and orients the matrix material. The final product properties depend on and can be controlled by stretching time-temperature relationships and on the type and degree of stretch. For maximum opacity and texture, the stretching is done just above the glass transition temperature of the matrix polymer. When stretching is done in the neighborhood of the higher glass transition temperature, both phases may stretch together and opacity decreases. In the former case, the materials are pulled apart, a mechanical anticompatibilization process.

In general, void formation occurs independent of, and does not require, crystalline orientation of the matrix polymer. Opaque, microvoided films have been made in accordance with the methods of this invention using completely amorphous, noncrystallizing copolyesters as the matrix phase. Crystallizable/orientable (strain hardening) matrix materials are preferred for some properties like tensile strength and gas transmission barrier. On the other hand, amorphous matrix materials have special utility in other areas like tear resistance and heat sealability. The specific matrix composition can be tailored to meet many product needs. The complete range from crystalline to amorphous matrix polymer is part of the invention.

The complex lenses of the invention preferably comprise polymers. Polymers are preferred as they are generally lower in cost compared to prior art glass lenses, have excellent optical properties and can be efficiently formed into lenses utilizing known processes such as melt extrusion, vacuum forming and injection molding. Preferred polymers for the formation of the complex lenses include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferred polyvinyl resins include polyvinyl chloride, poly(vinyl acetal), and mixtures thereof. Copolymers of vinyl resins can also be utilized. Preferred polyesters for the complex lens of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof.

The reflection sheets may be coated or treated before or after thermoplastic lenslet casting with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion.

The light reflector of the invention may also be used in conjunction with a light diffuser, for example a bulk diffuser, a lenticular layer, a beaded layer, a surface diffuser, a holographic diffuser, a micro-structured diffuser, another lens array, or various combinations thereof. The lenslet diffuse reflection film disperses, or diffuses, the light, thus destroying any diffraction pattern that may arise from the addition of an ordered periodic lens array. The lenslet diffuse reflector film may be positioned before or after any diffuser or lens array.

The base of the invention can also include, in another aspect, one or more optical coatings to improve optical transmission through one or more lenslet channels. It is often desirable to coat a diffuse reflector with a layer of an anti-reflective (AR) coating in order to raise the efficiency of the reflector or transflector.

In the manufacturing process for the complex lens light reflector films of the present invention, preferred lens polymers are melt extruded from a slit die. In general, a T die or a coat hanger die are preferably used. The process involves extruding the polymer or polymer blend through a slit die and rapidly quenching the extruded web upon a chilled casting drum with the preferred lens geometry so that the lens polymer component of the transparent sheet are quenched below their glass solidification temperature and retain the shape of the complex lens.

A method of fabricating a diffusion film assembly was developed. The preferred approach comprises the steps of providing a positive master chill roll having a plurality of complex lenses. The diffusion film is replicated from the master chill roller by casting a molten polymeric material to the face of the chill roll and transferring the polymeric material with lenslet structures onto a polymeric film.

A chill roller is manufactured by a process including the steps of electroplating a layer of cooper onto the surface of a roller, and then abrasively blasting the surface of the copper layer with beads, such as glass or silicon dioxide, to create a surface texture with hemispherical features. The resulting blasted surface is bright nickel electroplated or chromed to a depth that results in a surface texture with the features either concave into the roll or convex out of the roll. Because of the release characteristics of the chill roll surface, the resin will not adhere to the surface of the roller.

The bead blasting operation is carried out using an automated direct pressure system in which the nozzle feed rate, nozzle distance from the roller surface, the roller rotation rate during the blasting operation and the velocity of the particles are accurately controlled to create the desired lenslet structure.

The number of features in the chill roll per area is determined by the bead size and the pattern depth. Larger bead diameters and deeper patterns result in fewer numbers of features in a given area. Therefore the number of features is inherently determined by the bead size and the pattern depth.

The complex lenses of the invention may also be manufactured by vacuum forming around a pattern, injection molding the lenses and embossing lenses in a polymer web. While these manufacturing techniques do yield acceptable lenses capable of efficiently diffusing light, melt cast coating polymer onto a patterned roll and subsequent transfer onto a transparent polymer web allows for the lenses of the invention to be formed into rolls thereby lowering the manufacturing cost for the diffusion lenses. Further, cast coating polymer has been shown to more efficiently replicate the desired complex lens geometry compared to embossing and vacuum forming.

The invention may be used in conjunction with any liquid crystal display devices, typical arrangements of which are described in the following. Liquid crystals (LC) are widely used for electronic displays. In these display systems, an LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, electronic games for which light weight, low power consumption and long operating life are important features.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. Operational mode of LCD using the twisted nematic liquid crystal is roughly divided into a birefringence mode and an optical rotatory mode. "Film-compensated super-twisted nematic" (FSTN) LCDs are normally black, that is, light transmission is inhibited in the off state when no voltage is applied. OMI displays reportedly have faster response times and a broader operational temperature range.

Ordinary light from an incandescent bulb or from the sun is randomly polarized, that is, it includes waves that are oriented in all possible directions. A polarizer is a dichroic material that functions to convert a randomly polarized ("unpolarized") beam of light into a polarized one by selective removal of one of the two perpendicular plane-polarized components from the incident light beam. Linear polarizers are a key component of liquid-crystal display (LCD) devices.

There are several types of high dichroic ratio polarizers possessing sufficient optical performance for use in LCD devices. These polarizers are made of thin sheets of materials which transmit one polarization component and absorb the other mutually orthogonal component (this effect is known as dichroism). The most commonly used plastic sheet polarizers are composed of a thin, uniaxially-stretched polyvinyl alcohol (PVA) film which aligns the PVA polymer chains in a more-or-less parallel fashion. The aligned PVA is then doped with iodine molecules or a combination of colored dichroic dyes (see, for example, EP 0 182 632 A2, Sumitomo Chemical Company, Limited) which adsorb to and become uniaxially oriented by the PVA to produce a highly anisotropic matrix with a neutral gray coloration. To mechanically support the fragile PVA film it is then laminated on both sides with stiff layers of triacetyl cellulose (TAC), or similar support.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

The diffuse reflecting film of the present invention can even out the luminance when the film is used as a back reflecting film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The back reflector film serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and antiferroelectric liquid crystal mode, however, the invention is not restricted by the above combinations. In a liquid crystal display device, the reflective film of the present invention is necessary to be positioned behind the backlight. The reflective film can also be used in a reflective type display. Light enters the display from the environment and is reflected by the reflection film and illuminates the liquid crystal. The reflective film can also be used in a transflective display where the display operates in both reflection and transmission states. Examples of this are cell phones and PDA's where most times the back light is off and the display operates in reflection mode, but it also has a back light to work in transmission mode. The reflection film of the present invention can even the lightness of a liquid crystal display device across the display because the film has excellent light-scattering properties to expand the light to give excellent visibility in all directions. The present invention has a significant use as a light source destructuring device.

The diffuse reflector of the present invention, though focused on backlit displays, can be used in any situation where light needs to be diffusely reflected. The diffuse reflector of the present invention could be used as a diffuse mirror for bounce lighting for photography.

The diffuse reflection film could also be used for screens for front projection display. The reflector maximizes light available for bright, high-gain viewing. It provides excellent viewing under high ambient light conditions and utilize precise dispersion angles that allow for the maximum utilization of available light.

The reflection film can be used as a retroreflective member for a traffic sign. It can be used in a state applied to a car, a bicycle, person, etc.

The reflector of the present invention also has significant architectural uses such as providing appropriate light for work and living spaces. The complex lens reflector provides a more uniform light output when reflected so that light is diffused to all angles across the room evenly and with no hot spots.

Further, the reflector of the present invention can be used widely as a part for an optical equipment such as a displaying device. For example, it can be used in a reflective liquid crystal display device or a front scattering film directing the film to the front-side (observer's side) in the case of placing the metallic film to the back side of the device (opposite to the observer). The reflector film of the present invention can be used as an electrode by laminating a transparent conductive layer composed of indium oxide represented by ITO film.

Another application for the reflector film is a front projection screen, where it is generally desired to project the image from a light source onto a screen over a large area. The viewing angle for a television is typically smaller in the vertical direction than in the horizontal direction. The reflector acts to spread the light to increase viewing angle.

The variable reflector of the present invention can replace the dot printing on the light guide in an LCD. The light guide is typically a thick (approx. half a centimeter) piece of acrylic designed to guide the light from the light sources (located on at least one of the edges of the light guide) out to the display at a normal and to even the illumination from the light sources across the display. The evening of illumination is produced by a dot pattern printed on the back side (the side facing the reflector) of the wave guide. The dot pattern varies in size across the display (smaller and fewer dots towards the light source and larger and more frequent dots away from the light source). The dot pattern's purpose is to try to direct more light out from the light guide away from the light sources and less light out of the display near the light sources. This causes the brightness of the display to be more homogeneous. In this prior art method of evening illumination, printing is a very costly and time consuming because each light guide is screen printed individually. The current invention of a variable reflector can produce the same result of evening out the illumination by having more specular areas near the light source(s) and more diffuse areas away from the light source(s). In addition, the current invention is a roll to roll process making it much cheaper and faster to manufacturing. Having a variable reflector with a diffuse reflectance gradient behind the light guide eliminates the need for the screen printed dots thus eliminating a processing step and saving manufacturing time and money.

The variable reflector can display text in varying amounts of diffuse or specular reflection areas of text. These text reflectors, with text and designs, can be used in displays. Variable reflection sheets, with there ability to produce text and shapes with diffuse and specular areas, can be used as decoration, media displays, and product packaging producing for an unusual display effect. Other applications for the diffuse reflector are graphic displays, packaging, and labels.

The present invention has a significant use as a light source destructuring device. In many applications, it is desirable to eliminate from the output of the light source itself the structure of the filament which can be problematic in certain applications because light distributed across the sample will vary and this is undesirable. Also, variances in the orientation of a light source filament or arc after a light source is replaced can generate erroneous and misleading readings. A variable reflector film of the present invention placed behind the light source can eliminate from the reflection of the output of the light source any trace of the filament structure and therefore causes a homogenized output.

The variable reflector films of the present invention may also be used in the area of law enforcement and security systems to homogenize the output from laser diodes (LDs) or light emitting diodes (LEDs) over the entire secured area to provide higher contrasts to infrared (IR) detectors. The films of the present invention may also be used to remove structure from devices using LED or LD sources such as in bank note readers or skin treatment devices. This leads to greater accuracy. The variable reflection films can be used to even the illumination of any light source, for example: LED, LD, fluorescent, incandescent, and halogen.

The variable reflector films of the present invention may also be used to diffusely illuminate artwork. The variable reflector provides a suitable appropriately sized and directed aperture for depicting the artwork in a most desirable fashion.

Embodiments of the invention may provide not only improved light reflection and diffuse reflection but also a reflection film of reduced thickness.

The entire contents of the patents and other publications referred to in this specification are incorporated herein by reference.

EXAMPLE

In this example, complex lens diffuse reflector of the invention were created by extrusion casting an extrusion grade polyolefin polymer against a pattered chill roll containing a varying complex lens geometry. The patterned polyolefin polymer, in the form of complex lenses was then transferred to a polyester web material. A metal deposition coating was the applied thereby forming a diffuse light reflector with complex surface lenses. This example will show that varying size, geometry, and complexity complex surface lenses formed on a transparent polymer web material will produce variable diffuse reflection across a reflection film providing exceptional light reflection. Further, it will be obvious that the light reflector will be low in cost and have mechanical properties that allow for insertion into LC devices.

A patterned chill roll (variable geometry complex lens) was manufactured by a process including the steps of electroplating a layer of cooper onto the surface of a roller, and then abrasively blasting the surface of the copper layer with glass beads to create a surface texture with hemispherical features. The resulting blasted surface was bright nickel electroplated to a depth that results in a surface texture with the features either concave into the roll or convex out of the roll. The bead blasting operation was carried out using an automated direct pressure system in which the nozzle feed rate, nozzle distance from the roller surface, the roller rotation rate during the blasting operation and the velocity of the particles are accurately controlled to create the desired complex lens structure. The bead diameter and bead blasting operations were varied to create fewer, larger, less complex lenses towards the perimeter of the roll compared to the center of the roll. The number of features in the chill roll per area is determined by the bead size and the pattern depth. Larger bead diameters and deeper patterns result in fewer numbers of features in a given area.

The complex lens patterned roll was manufactured by starting with a steel roll blank and grit blasted with size 14 grit at a pressure of 447 Mpa in the center of the roll and progressively larger grit up to size 10 grit with a pressure of 447 Mpa along the edge of the roll. The roll was then chrome platted. The chrome platting process was consistent across the roll. The resulting complex lenses on the surface of the roll were convex with smaller and more complex lenses in the middle of the roll and larger and more simple lenses at the edges of the roll.

The patterned chill roll was utilized to create diffuse reflection sheets by extrusion coating a polyolefin polymer from a coat hanger slot die comprising substantially 96.5% LDPE (Eastman Chemical grade D4002P), 3% Zinc Oxide and 0.5% of calcium stearate onto a 100 micrometer transparent oriented web polyester web with a % light transmission of 97.2%. The polyolefin cast coating coverage was 25.88 g/m$^2$. The polymer was then coated with a 0.1 micrometer layer of aluminum vacuum metallized on the side of the web with the complex lenses.

Vacuum metallizing uses high purity aluminum wire fed into a crucible to produce a metallic vapor stream. The vapor is condensed onto a polymeric substrate. Sputter coating could have also been used and could have deposited other materials besides aluminum, such as copper, silver, or stainless steel.

The invention materials containing complex lenses on the center of the roll had randomly distributed lenses comprising a major lens with an average diameter of 27.1 micrometers and minor lenses on the surface of the major lenses with an average diameter of 6.7 micrometers. The average minor to major lens ratio was 17.2 to 1. The complex lenses on the edge of the roll had randomly distributed lenses comprising a major lens with an average diameter of 50 micrometers and minor lenses on the surface of the major lenses with an average diameter of 15 micrometers. The average minor to major lens ratio was 5.6 to 1. The structure of the cast coated reflection sheets is as follows, Aluminum Coating
Formed Polyolefin Lenses
Transparent Polyester Base The diffusion sheet containing variable sized polymer lenses coated with aluminum from above were measured for percent diffuse reflectance, percent total reflectance, and percent total light transmission, all at 500 nm.

Reflection film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NMST-traceable) was placed at the normal sample port. The diffuse transmittance spectra were measured in like manner, but with the 99% tile removed. The diffuse reflectance spectra were measured by placing the samples at the sample port with the coated side towards the integrating sphere. The total reflectance spectra were measured by placing the samples at the sample port with the coated side towards the integrating sphere and the incoming light at an angle. In order to exclude reflection from a sample backing, nothing was placed behind the sample. All spectra were acquired between 350 and 800 nm. As the reflectance results are quoted with respect to the 99% tile, the values are not absolute, but would need to be corrected by the calibration report of the 99% tile. Total transmission and total reflection, when added, may not add up to 100% due to absorbencies of the sample or slight variations in the sample measured.

Percentage total transmitted light refers to percent of light that is transmitted though the sample at all angles. Diffuse transmittance is defined as the percent of light passing though the sample excluding a 2.5 degree angle from the incident light angle compared to the amount of light from the light source. The diffuse light transmission is the percent of light that is passed through the sample by diffuse transmittance. Diffuse reflectance is defined as the percent of light reflected by the sample and reflected more than 2.5 degrees. Percentage total reflected light refers to percent of light that is reflected through the sample and reflected at all angles. Diffuse reflection efficiency is the percent diffusely reflected light divided by the total reflected light multiplied by 100. The percentages quoted in the examples were measured at 500 nm.

The measured values for the invention are listed in Table 1 below.

TABLE 1

| Sample | Center of Roll | 5 cm off Center | 10 cm off Center | 15 cm off Center | 20 cm off Center (Edge of Roll) |
| --- | --- | --- | --- | --- | --- |
| Grit Size Used | 14 | 13 | 12 | 11 | 10 |
| Total reflection at 500 nm | 90.2% | 91.9% | 92.1% | 93.5% | 94.0% |
| Diffuse reflection at 500 nm | 88.0% | 78.9% | 42.0% | 35.4% | 20.1% |
| Diffuse reflection efficiency at 500 nm | 97.6% | 85.9% | 45.6% | 37.9% | 21.4% |

As the data above clearly indicates, the variable diffusion complex polymer lenses formed on the surface of a transparent polymer with an aluminum coating provides tailored variable light reflection allowing for brighter and more evenly illuminated liquid crystal display devices. From the center of the film to the edge, the percent total reflection varied 3.8%, the diffuse reflection varied 67.9%, and the diffuse reflection efficiency varied 76.2%. This variable reflection film from the example would be utilized in a back lit display where the light was located in the middle of the display. In this example, the percent total light reflection increased and diffuse light reflection decreased from the center of the roll to the edge of the roll. The film is more diffuse and slightly less reflective in the center of the display where the light is located, to compensate for the light intensity of the light bulb, by spreading the light out more. Towards the edge of the film and display, away from the light source, more light reflects specularly to create an even light intensity across the entire display. This tailoring of the reflection film to the back lit display enables a brighter and more evenly illuminated display. The reflector with tailored diffuse reflection across the roll can deliver more light intensity and more uniform light to the viewer.

With a uniform reflector, the level of reflection and corresponding diffuse reflection are determined by the area of the display that needs the most diffuse reflection. This level of diffuse reflectance and specular reflectance are set for the entire sheet, even though lower levels of diffuse reflection are sufficient in some areas of the display. A uniform light reflector would require the characteristics of the center of the variable film by the light source, 90.2% total reflection and 88.0% diffuse reflection because those values are needed to adequately diffuse the light source. This reflector would cause a more uneven display compared to the variable reflector. It would also cause a darker display because of the light that is scattered at high angles around the edge of the display is lost. Utilizing a variable reflector increases the brightness or battery life of the display. The complex lenses, voided polymer, bulk, and surface reflectors are well suited to be tailored either pre or post manufacture to obtain this tailored, variable reflection.

The variable reflector of the present invention can replace the dot printing on the light guide in an LCD. The light guide is typically a thick (approx. half a centimeter) piece of acrylic designed to guide the light from the light sources (located on at least one of the edges of the light guide) out to the display at a normal and to even the illumination from the light sources across the display. The evening of illumination is produced by a dot pattern printed on the back side (the side facing the reflector) of the wave guide. The dot pattern varies in size across the display (smaller and fewer dots towards the light source and larger and more frequent dots away from the light source). The dot pattern's purpose is to try to direct more light out from the light guide away from the light sources and less light out of the display near the light sources. This causes the brightness of the display to be more homogeneous. In this prior art method of evening illumination, printing is a very costly and time consuming because each light guide is screen printed individually. The current invention of a variable reflector can produce the same result of evening out the illumination by having more specular areas near the light source(s) and more diffuse areas away from the light source(s). In addition, the current invention is a roll to roll process making it much cheaper and faster to manufacturing. Having a variable reflector with a diffuse reflectance gradient behind the light guide eliminates the need for the screen printed dots thus eliminating a processing step and saving manufacturing time and money.

Further, because the invention materials were constructed on an oriented polyester base, the materials have a higher elastic modulus compared to cast reflection sheets. The oriented polymer base of the example allow for the light reflector to be thin and therefore cost efficient and light as the materials content of the example materials is reduced compared to prior art materials.

While this example was primarily directed toward the use of light reflecting materials for LC devices, the materials of the invention have value in other reflection applications such as back light display, imaging elements containing a reflection layer, a reflector for specular home lighting, and media display.

Parts List

2. Light guide
4. Lamp Reflector
6. Reflection tape
8. Variable light reflection film
10. Reflection tape
12. Light diffusion film
14. Brightness enhancement film
16. Polarization film
18. Visible light source
20. Transparent polymer base
22. Major lens
24. Minor lens
26. Surface of transparent polymer base
30. Intricate complex lens
32. Simpler complex lens
34. Aluminum coating
61. Film with diffusion efficiency variation with iso-efficiency areas that exhibit an elliptical pattern
63. Elliptically shaped area of iso-diffusion efficiency
65. Elliptically shaped area of iso-diffusion efficiency
67. Elliptically shaped area of iso-diffusion efficiency
71. Film with diffusion efficiency variation comprising a repeating pattern
73. Pattern of diffusion efficiency variation
81. Variable light reflection film with colored areas
83. Transparent polymer base
85. Complex lenses
87. Flattened lenses
89. Aluminum coating
91. Colorant

What is claimed is:

1. A diffuse reflector polymeric film comprising a macro reflection efficiency variation that is greater than 5% over an in plane distance of at least 2 cm using an integrating sphere with a light entry port of 25.4 mm diameter, the reflector film having a reflectivity at 500 nanometers of greater than 50%.

2. The diffuse reflector of claim 1 wherein the reflection efficiency varies by more than 50 percent in two different locations of the diffuse reflector.

3. The diffuse reflector of claim 1 wherein the reflection efficiency variation comprises a gradient.

4. The diffuse reflector of claim 1 that is rectangular in shape wherein there is reflection efficiency variation along a diagonal of the rectangle.

5. The diffuse reflector of claim 1 that is rectangular in shape wherein there is reflection efficiency variation along the width or height of the rectangle.

6. The diffuse reflector of claim 1 wherein there is reflection efficiency variation from the center to the perimeter.

7. The diffuse reflector of claim 1 wherein there is a reflection efficiency variation along the perimeter.

8. The diffuse reflector of claim 1 wherein the reflection efficiency variation is such that iso-efficiency exhibits an elliptical pattern.

9. The diffuse reflector of claim 1 wherein the reflection efficiency variation comprises a repeating pattern.

10. The diffuse reflector of claim 1 wherein the reflection efficiency variation comprises a specular reflection component.

11. The diffuse reflector of claim 1 wherein the reflection efficiency variation provides values at least 10% less on the edges than in the center of said diffuse reflector.

12. The diffuse reflector of claim 1 wherein the diffuse reflector comprises at least one reflective layer and at least one film.

13. The diffuse reflector of claim 12 wherein the reflective layer is adhesively bonded to the film.

14. The diffuse reflector of claim 12 wherein the reflective layer is integral to the bottom surface of the film.

15. The diffuse reflector of claim 12 wherein the reflective layer is integral to the top surface of the film.

16. The diffuse reflector of claim 12 wherein the film is reflective.

17. The diffuse reflector of claim 12 wherein the reflective layer comprises a metal.

18. The diffuse reflector of claim 12 wherein the reflective layer comprises an alloy.

19. The diffuse reflector of claim 12 wherein the reflective layer comprises an oxide.

20. The diffuse reflector of claim 12 wherein the reflective layer comprises layers of polymer with differing indexes of refraction.

21. The diffuse reflector of claim 12 wherein the reflective layer comprises greater than 30 layers of polymer with differing indexes of refraction between at least two adjacent layers of 0.03 to 0.15.

22. The diffuse reflector of claim 12 wherein the reflective layer thickness is 0.5 nanometers to 50 micrometers.

23. The diffuse reflector of claim 12 wherein the reflective layer thickness is 0.25 to 50 nanometers.

24. The diffuse reflector of claim 12 wherein the reflective layer thickness is from 0.50 to 50.0 nanometers.

25. The diffuse reflector of claim 12 wherein the reflective layer has a reflectivity at 500 nanometers of greater than 50%.

26. The diffuse reflector of claim 12 wherein the reflective layer has a reflectivity at 500 nanometers of greater than 94%.

27. The diffuse reflector of claim 12 wherein the reflective layer has a resistivity of 0.03 to 1800 ohms per square.

28. The diffuse reflector of claim 1 further comprising a base and a plurality of convex or concave complex lenses on the surface of said base.

29. The diffuse reflector of claim 28 wherein the complex lenses are reflective.

30. The diffuse reflector of claim 28 wherein the said convex or concave complex lenses are randomly distributed on the surface.

31. The diffuse reflector of claim 28 wherein said concave or convex complex lenses have an average width in the x and y direction of 3 to 60 microns.

32. The diffuse reflector of claim 28 wherein said concave or convex complex lenses have a height/diameter ratio of 0.03 to 1.0.

33. The diffuse reflector of claim 28 wherein said concave or convex complex lenses comprise a multiple of minor lenses wherein the minor lenses have a width in the x and y direction of 2 to 20 microns.

34. The diffuse reflector of claim 1 further comprising a microvoided polymer sheet.

35. The diffuse reflector of claim 34 wherein the microvoided polymer sheet comprises substantially circular voids.

36. The diffuse reflector of claim 1 wherein said diffuse reflector comprises a surface diffuser.

37. The diffuse reflector of claim 1 wherein said diffuse reflector comprises a bulk diffuser.

38. The diffuse reflector of claim 1 wherein said diffuse reflector comprises a base comprising a surface microstructure.

39. The diffuse reflector of claim 1 wherein said diffuse reflector comprises a colored element.

40. The diffuse reflector of claim 1 wherein said macro reflection efficiency variation comprises chromatic reflection.

41. A back lighted imaging media comprising a light source and a diffuse reflector comprising a macro reflection efficiency variation according to claim 1.

42. A liquid crystal device comprising a light source and a diffuse reflector comprising a macro reflection efficiency variation according to claim 1, wherein the diffuse reflector is located between the light source and a polarizing film.

* * * * *